United States Patent
Ploch

(10) Patent No.: US 11,353,913 B2
(45) Date of Patent: Jun. 7, 2022

(54) HANDLE INTERLOCK UTILIZING SEAT BACK ROTATION

(71) Applicants: Magna Seating Inc., Aurora (CA);
Steven Ploch, White Lake, MI (US)

(72) Inventor: Steven Ploch, White Lake, MI (US)

(73) Assignee: Magna Seating Inc., Aurora (CA)

(*) Notice: Subject to any disclaimer, the term of this patent is extended or adjusted under 35 U.S.C. 154(b) by 0 days.

(21) Appl. No.: 17/294,439

(22) PCT Filed: Nov. 18, 2019

(86) PCT No.: PCT/US2019/061922
§ 371 (c)(1),
(2) Date: May 17, 2021

(87) PCT Pub. No.: WO2020/102792
PCT Pub. Date: May 22, 2020

(65) Prior Publication Data
US 2021/0405681 A1 Dec. 30, 2021

Related U.S. Application Data

(60) Provisional application No. 62/768,132, filed on Nov. 16, 2018.

(51) Int. Cl.
| | |
|---|---|
| *G05G 5/05* | (2006.01) |
| *B60N 2/90* | (2018.01) |
| *B60N 2/12* | (2006.01) |
| *B60N 2/30* | (2006.01) |
| *G05G 1/04* | (2006.01) |

(52) U.S. Cl.
CPC ............ *G05G 5/05* (2013.01); *B60N 2/12* (2013.01); *B60N 2/3011* (2013.01); *B60N 2/3045* (2013.01); *B60N 2/933* (2018.02); *G05G 1/04* (2013.01); *B60N 2002/948* (2018.02)

(58) Field of Classification Search
CPC ........ B60N 2/933; B60N 2/12; B60N 2/3011; B60N 2/3045; B60N 2002/948; G05G 5/05; G05G 1/04
USPC ......... 297/463.1, 65.01, 65.03, 65.09, 65.16, 297/326, 335
See application file for complete search history.

(56) References Cited

U.S. PATENT DOCUMENTS

| | | | |
|---|---|---|---|
| 5,522,643 A * | 6/1996 | Matsuura | B60N 2/2354 297/367 R |
| 5,938,286 A | 8/1999 | Jones et al. | |
| 6,601,900 B1 | 8/2003 | Seibold | |

(Continued)

*Primary Examiner* — Mark R Wendell
(74) *Attorney, Agent, or Firm* — Miller Canfield

(57) ABSTRACT

An interlock mechanism prevents erroneous operation of a vehicle rear seat. The vehicle seat has a seat back rotatably coupled to a seat cushion. The interlock mechanism includes a handle pivot link, a latch pivot link, and an interlock bracket rotatably coupled to a pivot pin. When the seat back is in an upright position, the interlock bracket releasably couples the handle pivot link to the latch pivot link such that rotation of the handle pivot link rotates the latch pivot link causing the cushion latches to be released. When the seat back is folded towards the seat cushion, the interlock bracket is moved to an interlock position decoupling the handle pivot link and the latch pivot link such that rotating the handle pivot link does not rotate the latch pivot link and does not release the cushion latches.

16 Claims, 7 Drawing Sheets

(56) References Cited

U.S. PATENT DOCUMENTS

| | | | | |
|---|---|---|---|---|
| 7,243,974 B2* | 7/2007 | Kondo | ............... | B60N 2/01541 |
| | | | | 296/65.03 |
| 7,631,907 B2* | 12/2009 | Sato | .................. | B60N 2/01583 |
| | | | | 292/216 |
| 7,762,605 B2* | 7/2010 | Otsuka | ................ | B60N 2/3011 |
| | | | | 296/65.03 |
| 7,802,490 B2 | 9/2010 | Ingraham | | |
| 7,857,392 B2 | 12/2010 | Hayakawa et al. | | |
| 8,052,194 B2* | 11/2011 | Sayama | ............... | B60N 2/3079 |
| | | | | 296/65.09 |
| 8,287,037 B2 | 10/2012 | Sayama | | |
| 8,333,421 B2* | 12/2012 | Blake | ................. | B60N 2/01583 |
| | | | | 296/65.03 |
| 8,511,723 B2* | 8/2013 | Otsuka | ............... | B60N 2/01583 |
| | | | | 292/216 |
| 8,864,209 B2* | 10/2014 | White | .................. | B60N 2/3097 |
| | | | | 296/65.01 |
| 9,010,860 B2 | 4/2015 | Kume et al. | | |
| 10,124,700 B2 | 11/2018 | Jeong et al. | | |
| 2006/0066144 A1* | 3/2006 | Tsujibayashi | ........ | B60N 2/3079 |
| | | | | 297/378.14 |
| 2006/0255637 A1* | 11/2006 | O'Connor | ................ | B60N 2/20 |
| | | | | 297/331 |
| 2010/0207422 A1* | 8/2010 | Sayama | ............... | B60N 2/2362 |
| | | | | 296/66 |
| 2012/0242105 A1 | 9/2012 | Haeske et al. | | |

* cited by examiner

HANDLE INTERLOCK UTILIZING SEAT BACK ROTATION

CROSS-REFERENCE TO RELATED APPLICATIONS

This application claims priority to U.S. Provisional Application 62/768,132, filed on Nov. 16, 2018, the disclosure of which is hereby incorporated by reference in its entirety.

BACKGROUND OF THE INVENTION

1. Field of the Invention

The present invention relates to a handle interlock assembly to prevent erroneous operation of a rear seat for an automotive vehicle. More particularly, the invention relates to a vehicle rear seat having a seat back rotatably coupled to a seat cushion with the vehicle rear seat being repositionable between a design position, an easy-entry position, and a cargo position wherein the handle interlock assembly prevents the vehicle rear seat from being repositioned into the easy-entry position when the seat back has been folded towards the seat cushion.

2. Description of Related Art

Various interlock mechanisms are known for preventing erroneous operation of a vehicle seat. Vehicle seats generally comprise a seat back rotatably coupled to a seat cushion with the seat cushion supported above a vehicle floor by one or more legs. Certain known vehicle rear seats are repositionable between one or more of a design position, commonly described as "use position", a cargo position wherein the seat back is rotated downward onto or overlying the seat cushion, and an easy-entry position wherein the seat back is in a generally upright locked position with the seat cushion pitched forward.

Depending on the seating configuration of a vehicle, the vehicle seat may have insufficient clearance to reposition the vehicle seat to the easy-entry position while the seat back is rotated towards the seat cushion. In such situations, the vehicle seat being rotated towards the easy-entry position while the seat back is rotated towards the seat cushion is described as a "misuse" position. An interlock is therefore desired to prevent erroneous operation of the vehicle seat into the misuse position such that the vehicle seat is prevented from being repositioned to the easy-entry position while the seat back is rotated towards the seat cushion.

A first known interlock mechanism is disclosed in U.S. Pat. No. 8,287,037 wherein a vehicle rear seat has a seat back rotatably coupled to a seat cushion with the vehicle rear seat being repositionable between an upright use position, a cargo position wherein the seat back is rotated towards the seat cushion, and a storage position wherein the vehicle seat is rotated rearward and stored in a cavity in a vehicle floor. The interlock mechanism blocks movement of the vehicle seat from the cargo position to the storage position. The interlock mechanism comprises a main bracket, a second bracket rotatably coupled to the main bracket, and a movable locking pin to rotationally lock the second bracket to the main bracket. A pull strap is fixedly coupled to the main bracket. The second bracket is operatively coupled to a release cable for a seat latching mechanism. The movable locking pin is operatively coupled to the seat back such that when the seat back is folded towards the seat cushion, the locking pin is moved to a disengaged position with the second bracket. When the locking pin is disengaged from the second bracket, pulling the release strap does not actuate the latching release mechanism since the second bracket is not locked to the main bracket. When the seat back is in an upright position, the locking pin is moved to an engaged position with the second bracket. When the second bracket is locked to the main bracket, actuating the pull strap unlocks the latching mechanism such that the vehicle seat can be repositioned to the storage position.

A second known interlock mechanism is disclosed in U.S. Pat. No. 7,802,490 wherein a multifunction seat control system includes a pulley mechanism, an actuation shaft attached to an external handle, and multiple latch actuation cables. The pulley mechanism includes multiple circumferential slots in which the cables ride, and cable-end entryways through which associated cables can be inserted. A lockout device detects a seat-back position to selectively limit the rotationally travel of the pulley mechanism. The pulley mechanism is rotationally actuated to a predetermined angle to release a seat-back latch so the seat back can recline or fold forward, and beyond the predetermined angle to release seat bottom latches so the seat can tumble into a stowage configuration. The lockout device prevents rotation of the pulley mechanism beyond the predetermined angle if the seat back is not folded forward.

However, both these known interlock mechanisms are complex, expensive and require synchronized timing and close tolerances for proper functioning.

It is desirable, therefore, to provide a simple handle interlock assembly for a vehicle rear seat that prevents a seat latch from being moved to a disengaged position while the seat back is rotated forward onto the seat cushion. Further, it is desirable to have a handle interlock assembly preventing the vehicle rear seat from being repositioned into an easy-entry position when the seat back is folded towards the seat cushion.

SUMMARY OF THE INVENTION

A handle interlock assembly is provided for preventing erroneous operation of a vehicle rear seat by selectively decoupling a release handle from a seat cushion latch release. The vehicle seat has a seat back rotatably coupled to a seat cushion. The handle interlock assembly includes a handle pivot link, a latch pivot link, and an interlock bracket rotatably coupled to a pivot pin. When the seat back is in an upright position, the interlock bracket releasably couples the handle pivot link to the latch pivot link such that rotation of the handle pivot link rotates the latch pivot link causing the cushion latches to be released. When the seat back is folded towards the seat cushion, the interlock bracket is moved to an interlock position decoupling the handle pivot link and the latch pivot link such that rotating the handle pivot link does not rotate the latch pivot link.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-11 illustrate a handle interlock assembly and a vehicle rear seat having the handle interlock assembly according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
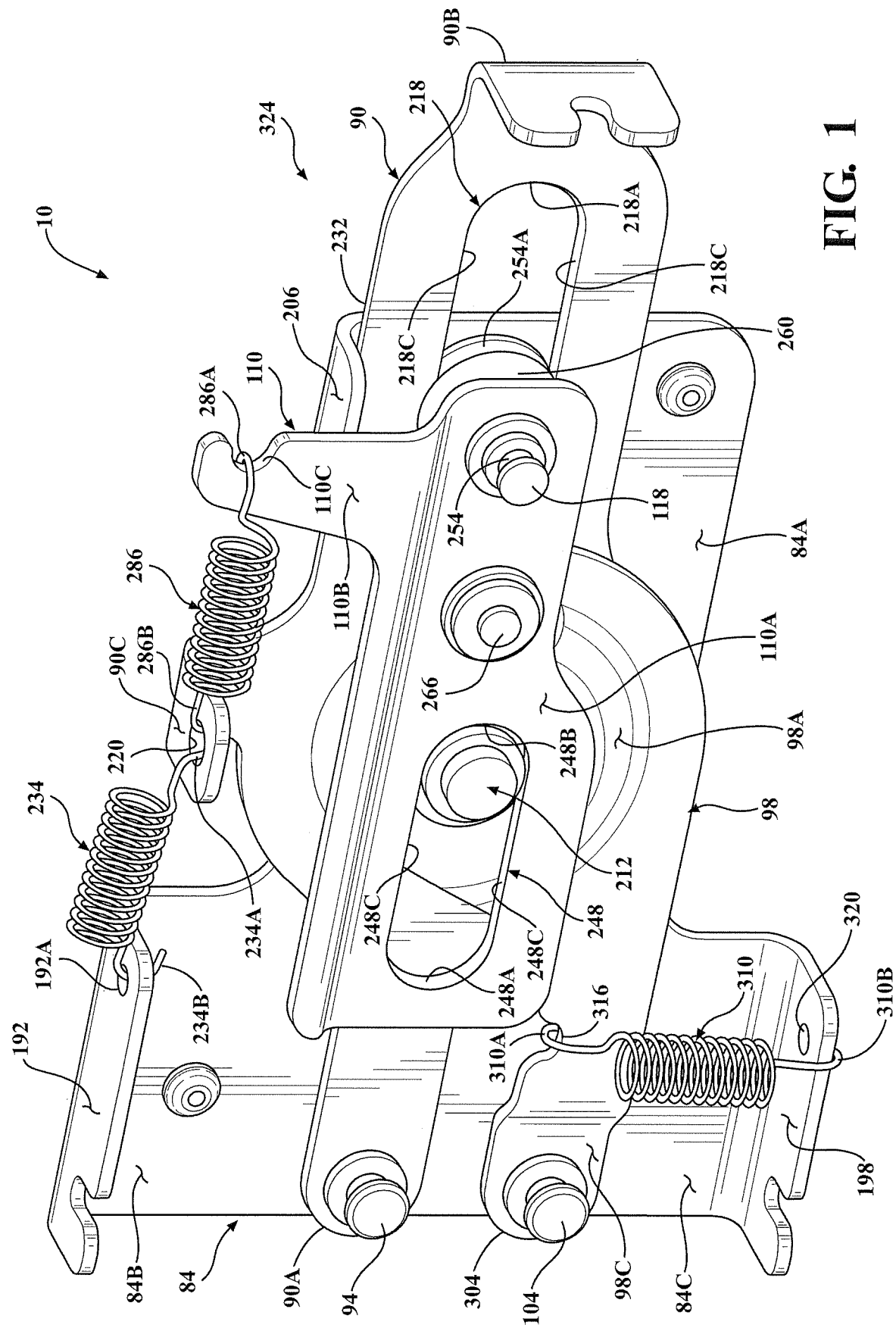
FIG. 1 is a perspective view of a handle interlock assembly, according to one embodiment of the present invention.
Figure 2:
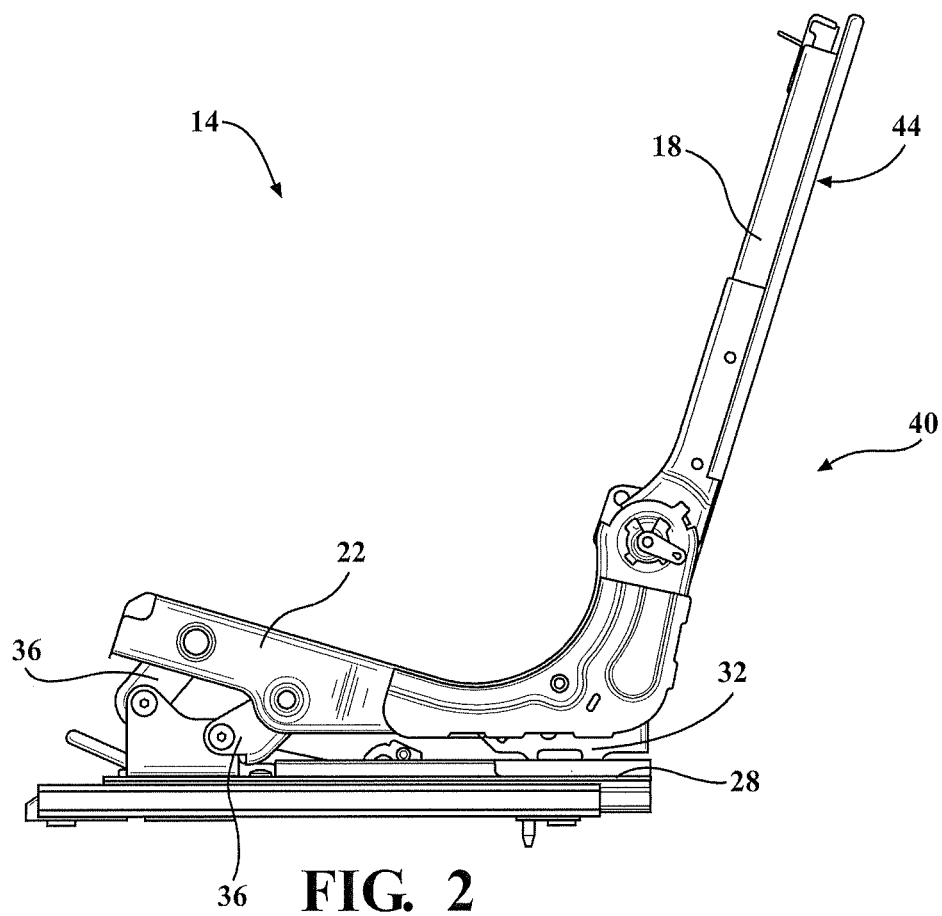
FIG. 2 is a side view of a vehicle rear seat in a design position (use position)

FIG. 1 illustrates a handle interlock assembly 10 for preventing erroneous operation of a vehicle rear seat 14 (shown in FIG. 2), according to an embodiment of the present invention. Referring to FIG. 2, the vehicle rear seat 14 includes a seat back 18 rotatably coupled to a seat cushion 22. The seat cushion 22 is releasably coupled to a seat base frame 28 by cushion latches 32 and is rotatably coupled to the seat base frame 28 by one or more pitch links 36. The seat base frame 28 can be a riser bracket, fore/aft adjusters, or the vehicle body, as is well known to those skilled in the art. The vehicle seat 14 is shown in a design, or use, position 40 in FIG. 2, with the seat back 18 in a generally upright locked position 44 and the cushion latches 32 coupled to the seat base frame 28.

Figure 3:
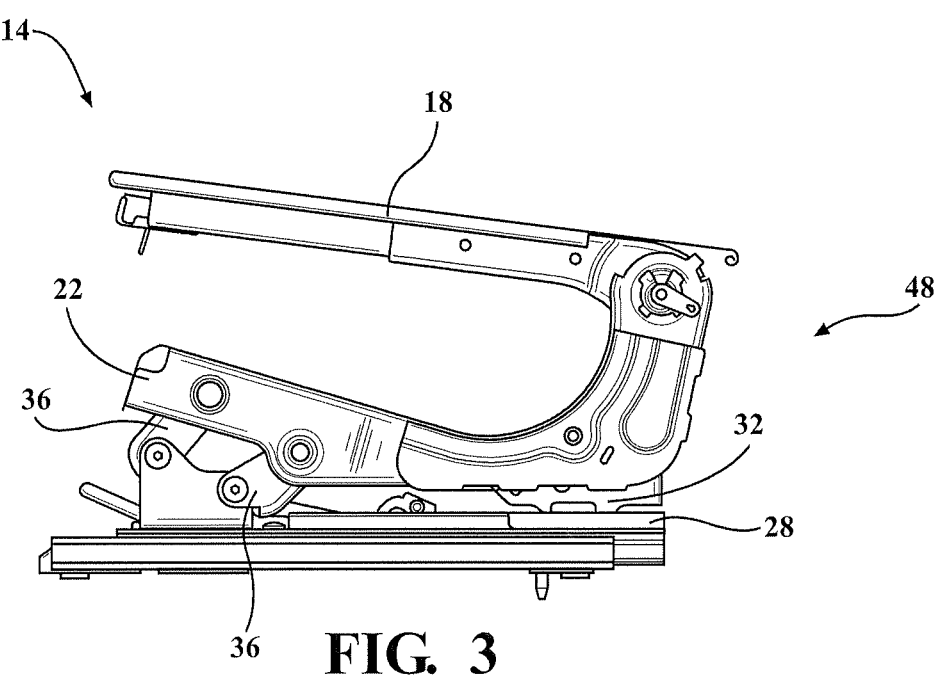
FIG. 3 is a side view of the vehicle rear seat of FIG. 2 in a cargo position.
Figure 4:
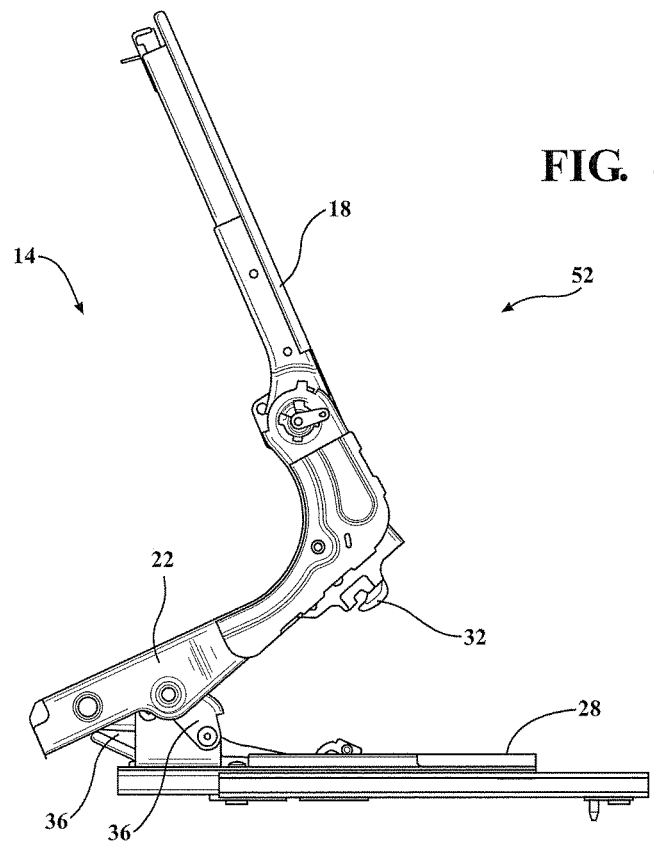
FIG. 4 is a side view the vehicle rear seat of FIG. 2 in an easy-entry position.

While the cushion latches 32 are coupled to the seat base frame 28 and the seat back 18 is in the upright locked position 44 shown in FIG. 2, unlocking the seat back 18 and rotating the seat back 18 towards the seat cushion 22 repositions the vehicle seat 14 into a cargo position 48, as illustrated in FIG. 3, with the seat back 18 overlying the seat cushion 22. When the vehicle seat 14 is in the design position 40 shown in FIG. 2 with the cushion latches 32 coupled to the seat base frame 28 and the seat back 18 in the upright locked position 44, the vehicle seat 14 may also be repositioned into an easy-entry position 52 by releasing the cushion latches 32 and rotating the pitch links 36 with respect to the seat base frame 28, i.e., pitching the vehicle seat 14 forward, as illustrated in FIG. 4.

Figure 5:
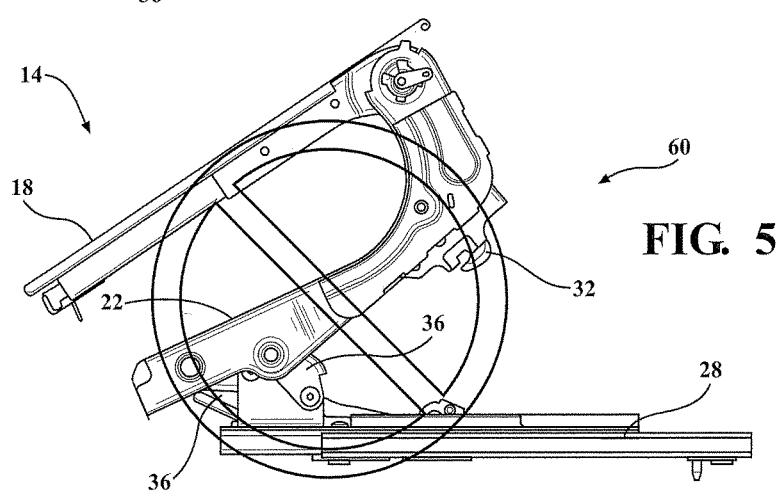
FIG. 5 is a side view of the vehicle rear seat of FIG. 2 in a misuse position.

The handle interlock assembly 10 retains the cushion latches 32 coupled to the seat base frame 28 when the vehicle seat 14 is in the cargo position 48 shown in FIG. 3. In order to move the vehicle seat 14 to the easy-entry position 52 from the cargo position 48, the vehicle seat 14 is first repositioned to the design position 40 with the seat back 18 in the upright locked position 44 prior to decoupling the cushion latches 32 and pitching the vehicle seat 14 forward to the easy-entry position 52. A misuse position 60 is shown in FIG. 5 where the cushion latches 32 are released when the vehicle seat 14 is in the cargo position 48 followed by the vehicle seat 14 being pitched forward towards the easy-entry position 52. In certain vehicles, it is desirable to prevent repositioning the vehicle seat 14 into the misuse position 60 shown in FIG. 5 since there may be insufficient clearance between the vehicle seat 14 and other components and/or vehicle seats 14 in a vehicle (not shown). As will be further described below, the handle interlock assembly 10 prevents movement of the vehicle seat 14 into the misuse position 60. More specifically, the handle interlock assembly 10 prevents actuation and release of the cushion latches 32 when the seat back 18 is pivoted or folded toward or into the cargo position 48.

Figure 6:
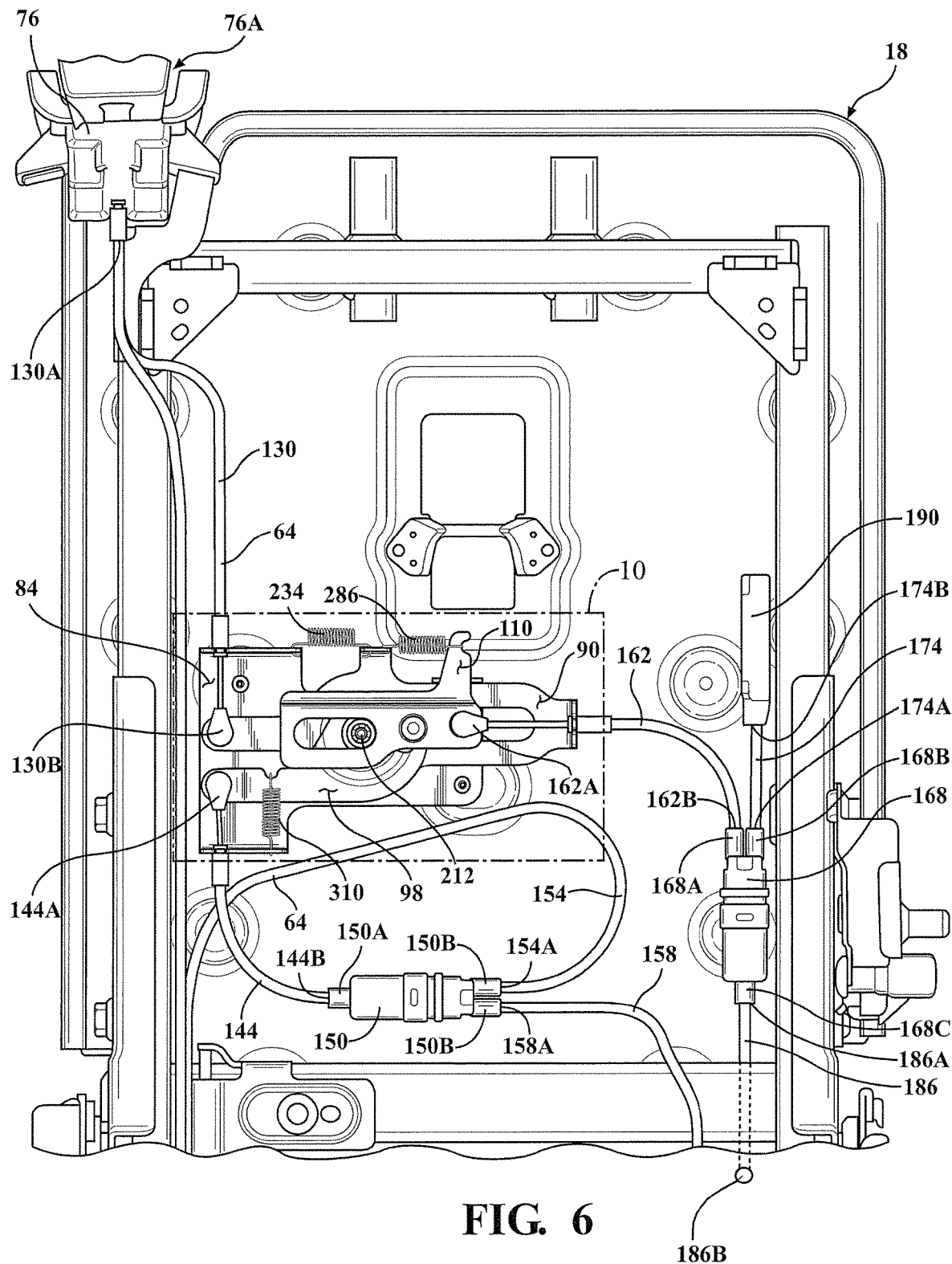
FIG. 6 is a front view of a portion of the vehicle seat of FIG. 2 having the handle interlock assembly of FIG. 1, according to one embodiment of the present invention.

A cutaway view of a portion of the seat back 18 is shown in FIG. 6 illustrating routing of cables 64 between the handle interlock assembly 10, an easy-entry handle 76, and the cushion latches 32, according to one embodiment of the present invention. Referring to FIG. 1, the handle interlock assembly 10 includes a base bracket 84, a handle pivot link 90 having a cable pin 94 fixedly coupled to the handle pivot link 90, a latch pivot link 98 having a cable pin 104 fixedly coupled to the latch pivot link 98, and an interlock bracket 110 having a cable pin 118 fixedly coupled to the interlock bracket 110. As shown in FIG. 6, the easy-entry handle 76 is pivotally mounted to the seat back 18.

FIG. 6 illustrates connections of cables 64 in the seat back 18 between the easy-entry handle 76, the handle interlock assembly 10, and the seat cushion latches 32. An easy-entry handle cable 130 has a first end 130A operatively coupled to the easy-entry handle 76 and a second end 130B fixedly coupled to the cable pin 94 on the handle pivot link 90. An interlock output cable 144 is fixedly coupled at a first end 144A to the cable pin 104 on the latch pivot link 98. A second end 144B of the interlock output cable 144 is connected to an input side 150A of a first cable splitter 150. First and second cushion latch cables 154, 158 have first ends 154A, 158A operatively coupled to an output side 150B of the first cable splitter 150 with opposing ends (not shown) of each cushion latch cable 154, 158 being operatively coupled to a respective cushion latch 32. An interlock input cable 162 is fixedly coupled at one end 162A to the cable pin 118 attached to the interlock bracket 110. An opposing end 162B of the interlock input cable 162 is operatively coupled to a first output 168A of an interlock cable splitter 168. One end 174A of a head restraint dump cable 174 is operatively coupled to a second output 168B of the interlock cable splitter 168 with a second end 174B of the head restraint dump cable 174 operatively coupled to a junction 190 with a head restraint cable (not shown). A seat back interlock cable 186 is operatively coupled at one end 186A to an input 168C to the interlock cable splitter 168 with an opposing end 186B fixedly coupled to the seat cushion 22 of the vehicle seat 14 such that the seat back interlock cable 186 is pulled, i.e., placed under tension, when the seat back 18 is folded towards the seat cushion 22.

It will be appreciated that alternative mechanisms may be substituted for the easy-entry handle 76, such as a lever, a button, a pull strap, and/or any other suitable mechanism for selectively applying tension to the easy-entry handle cable 130, as is well known to those skilled in the art. Likewise, it will be appreciated that the easy-entry handle cable 130, the interlock output cable 144, the interlock input cable 162, and/or the cushion latch cables 154, 158 may include any number of interconnected cables, and further may be substituted by mechanical linkages, as is well known to those skilled in the art and as desired for a specific vehicle seating application.

While not shown in the Figures, in a vehicle seat 14 lacking the handle interlock assembly 10, the second end 130B of the easy-entry handle cable 130 would be operatively coupled to the input side 150A of the first cable splitter 150. In this configuration, it will be appreciated that actuating the easy-entry handle 76 would actuate the cushion latch cables 154, 158 causing the cushion latches 32 to be decoupled from the seat base frame 28. Thus, the cushion latches 32 would be decoupled from the seat base frame 28 whenever the easy-entry handle 76 is actuated regardless of the position of the seat back 18. If the vehicle seat 14 is in the cargo position 48 and the easy-entry handle 76 actuated, then the vehicle seat 14 can be erroneously repositioned into the misuse position 60 shown in FIG. 5. However, inclusion of the handle interlock assembly 10, as shown in FIG. 6, prevents erroneous operation of the vehicle seat 14 into the misuse position 60.

Figure 7:
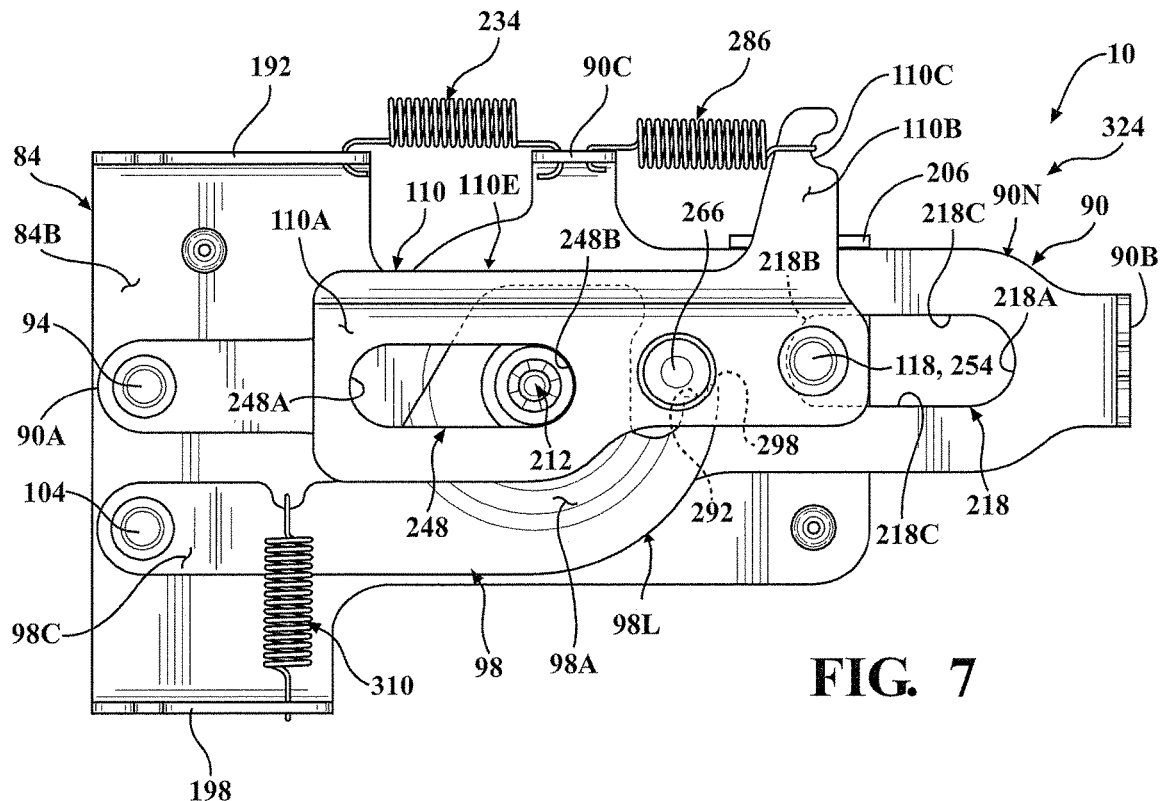
FIG. 7 is a front view of the handle interlock assembly of FIG. 1 showing the handle interlock assembly in a neutral position.

Referring to FIGS. 1 and 7, the base bracket 84 of the handle interlock assembly 10 has a generally planar main body portion 84A and upper and lower ears 84B, 84C extending from the main body portion 84A with the upper and lower ears 84B, 84C and the main body portion 84A form generally a T-shaped bracket 84. An upper lip 192 and a lower lip 198 project at an angle from the respective upper and lower ears 84B, 84C wherein the upper and lower lips 192, 198 and the upper and lower ears 84B, 84C forming generally a U-shape. A stop lip 206 projects at an angle from the main body portion 84A of the base bracket 84. While not shown in the Figures, the main body portion 84A includes an aperture through which a pivot pin 212 is inserted.

The handle pivot link 90, shown in FIGS. 1 and 7, is an elongated bracket 90 having the cable pin 94 mounted near a first end 90A of the handle pivot link 90 and having an elongated slot 218 extending in a longitudinal direction of the handle pivot link 90 and positioned near an opposing end 90B of the handle pivot link 90. The elongated slot 218 has a distal end 218A, a proximal end 218B, and opposing slot sides 218C.

The handle pivot link 90 is rotatably coupled to the base bracket 84 by the pivot pin 212. An upper spring mounting tab 90C extends at an angle from the handle pivot link 90 and includes a through hole 220. A first tension spring 234 has one end 234A operatively coupled to the through hole 220 in the upper spring mounting tab 90C and a second end 234B operatively coupled to an aperture 192A in the upper lip 192 of the base bracket 84. As shown in FIG. 7, the first tension spring 234 applies tension to bias the handle pivot link 90 in a counterclockwise direction about the pivot pin 212. The handle pivot link 90 can rotate in the counterclockwise direction, as viewed in FIG. 7, until an upper edge 232 of the handle pivot link 90 frictionally engages with the stop lip 206 of the base bracket 84.

Figure 8:
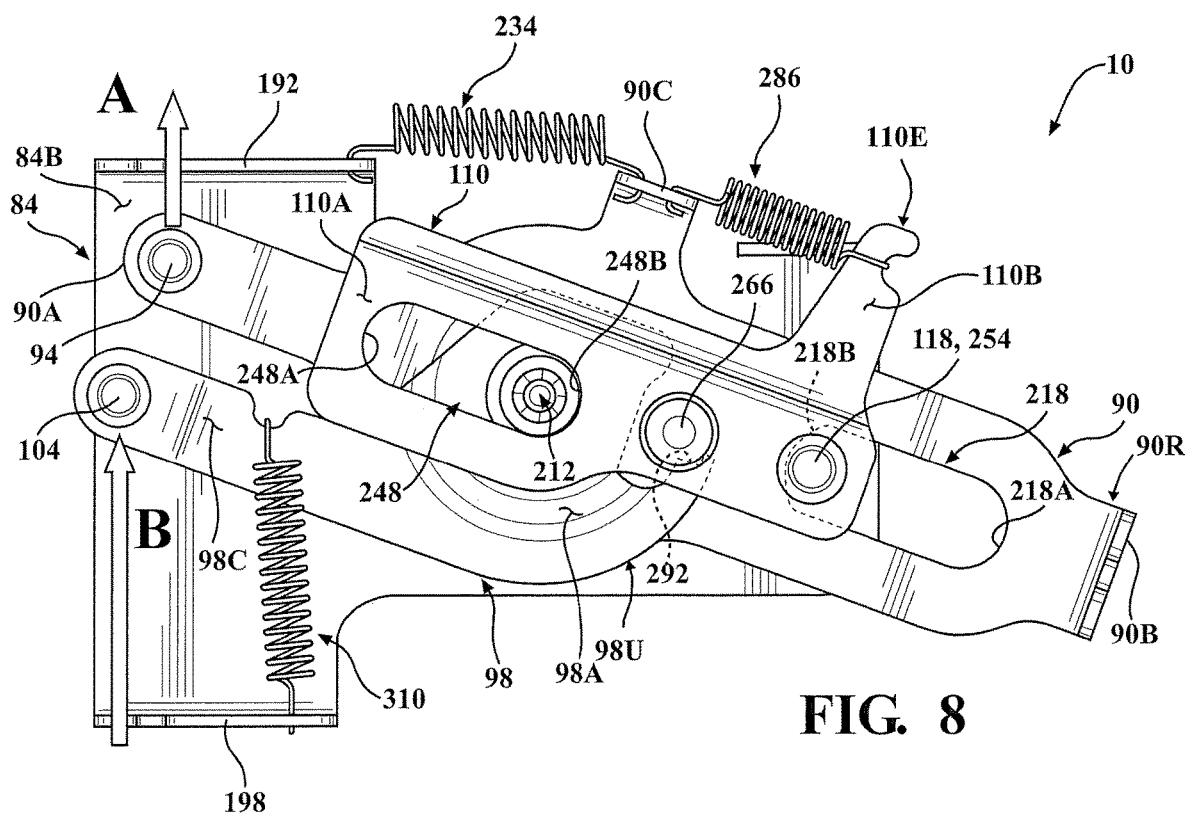
FIG. 8 is front view of the handle interlock assembly of FIG. 7 showing the rotation of a handle pivot link and a latch pivot link when an interlock bracket is in an engaged position.

Actuating the easy-entry handle 76 applies tension to the easy-entry handle cable 130 to urge the handle pivot link 90 to rotate in a clockwise direction as viewed in FIG. 8. The handle pivot link 90 will rotate in the clockwise direction as illustrated in FIG. 8 when the tension applied to the easy-entry handle cable 130 is greater than the tension applied by the first tension spring 234. When the easy-entry handle 76 is released and tension removed from the easy-entry handle cable 130, the first tension spring 234 rotates the handle pivot link 90 in the counterclockwise direction, as viewed in FIG. 7, until the handle pivot link 90 frictionally engages with the stop lip 206 on the base bracket 84.

The interlock bracket 110, as shown in FIG. 1, comprises a generally planar section 110A extending in a longitudinal direction of the interlock bracket 110. The planar section 110A includes a pivot slot 248 having a distal end 248A and a proximal end 248B, opposing side walls 248C, and extends in the longitudinal direction of the interlock bracket 110. The interlock bracket 110 is slidably and rotatably coupled to the pivot pin 212 extending through the pivot slot 248. A shaft 254 extends from the cable pin 118 on the interlock bracket 110 and passes through the elongated slot 218 in the handle pivot link 90. A flange 254A projects at an angle from the shaft 254 to retain the shaft 254 within the elongated slot 218 in the handle pivot link 90. A bushing and/or a spacer 260 is positioned on the shaft 254 between the interlock bracket 110 and the handle pivot link 90. Alternatively, the cable pin 118, shaft 254, spacer 260, and flange 254A can be constructed as a single integral component without varying from the scope of the invention. An interlock pin 266 is inserted through an aperture (not shown) in the interlock bracket 110. The interlock pin 266 is positioned between the pivot slot 248 and the shaft 254 on the interlock bracket 110 and projects generally perpendicular to the planar section 110A of the interlock bracket 110.

Figure 9:
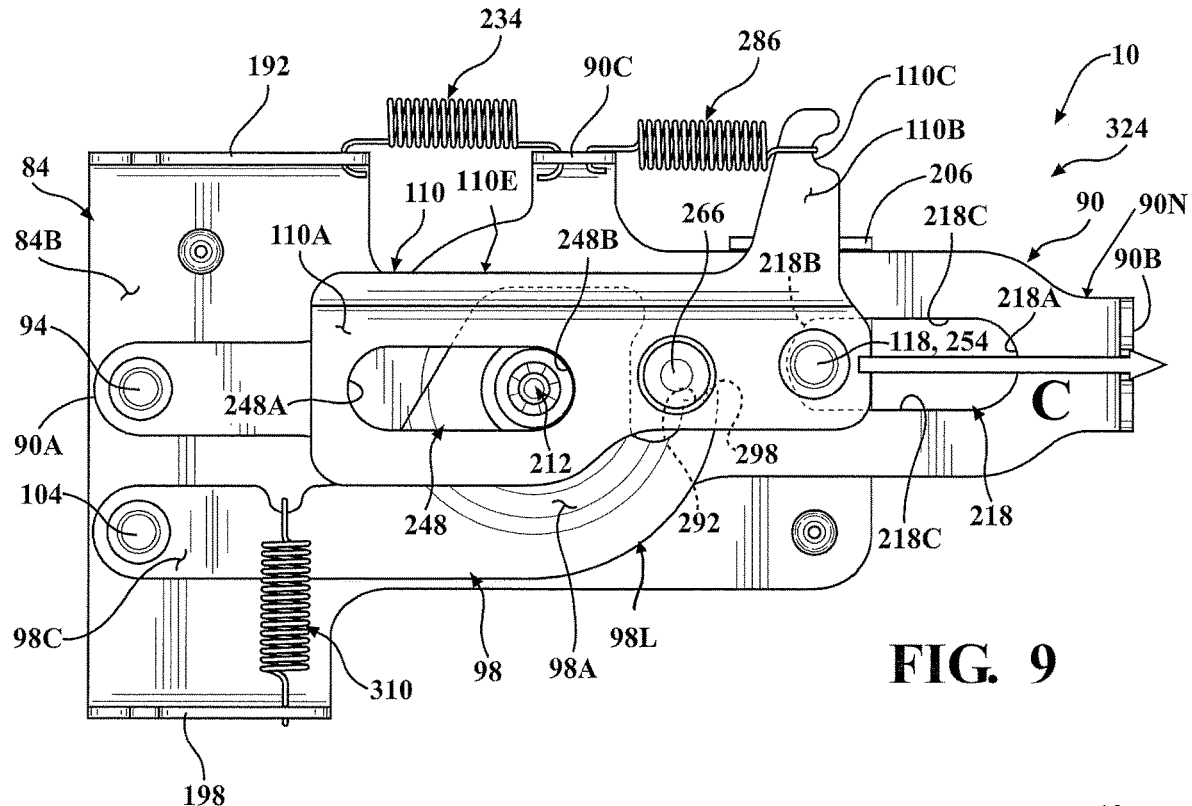
FIG. 9 is a front view of the handle interlock assembly of FIG. 7 illustrating the interlock bracket sliding laterally towards an interlock position.
Figure 10:
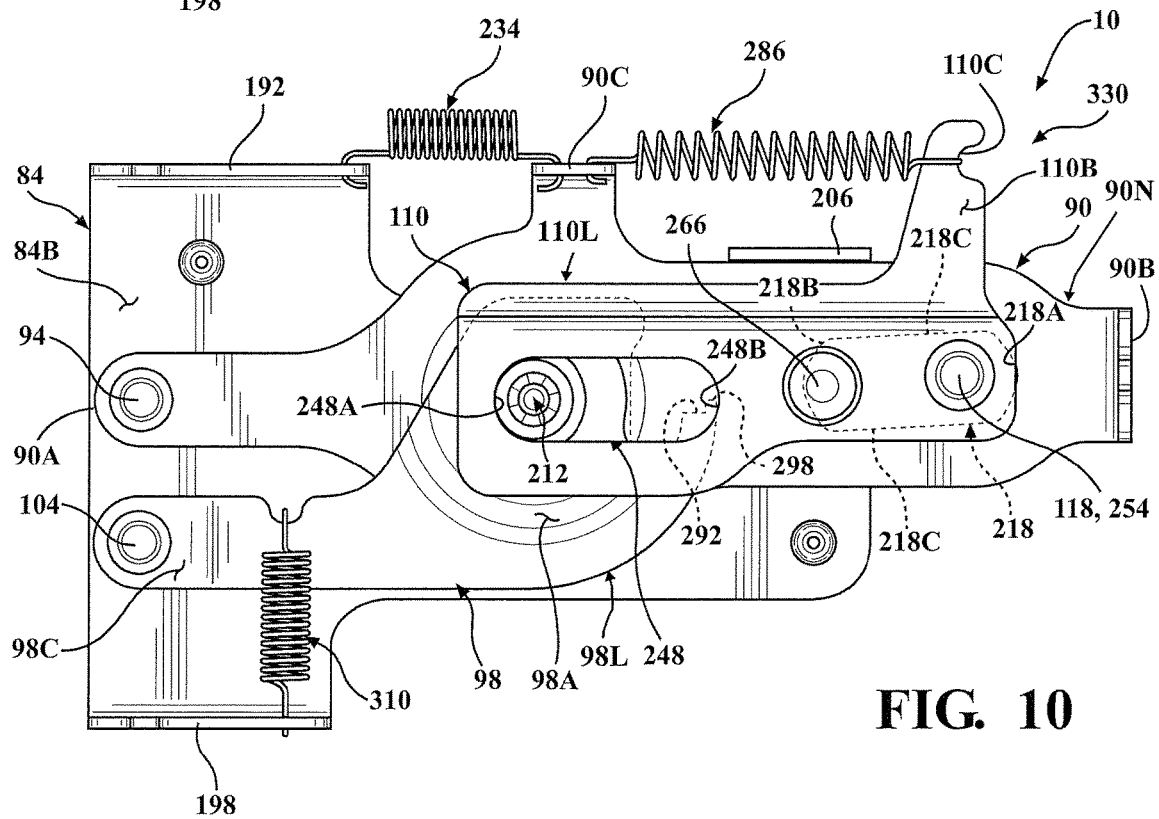
FIG. 10 is a front view of the handle interlock assembly of FIG. 8 with the interlock bracket in the interlock position.

As shown in FIGS. 9 and 10, the interlock bracket 110 can be repositioned with respect to the handle pivot link 90 by sliding the interlock bracket 110 along the longitudinal direction of the handle pivot link 90 since both the pivot pin 212 and the shaft 254 are slidable within their respective slots 248, 218. Thus, the interlock bracket 110 rotates with the handle pivot link 90 about the pivot pin 212 and the interlock bracket 110 is repositionable along the length of the elongated slot 218.

Extending at an angle from the planar section 110A of the interlock bracket 110 is a leg 110B having a locating notch 110C, as shown in FIG. 1. The leg 110B is offset from the planar section 110A of the interlock bracket 110 such that the leg 110B is spaced apart from the stop lip 206 on the base bracket 84. A second tension spring 286 has a first end 286A operatively coupled to the locating notch 110C on the interlock bracket 110 and a second end 286B operatively coupled to the through hole 220 in the upper spring mounting tab 90C of the handle pivot link 90. The second tension spring 286 biases the interlock pin 266 on the interlock bracket 110 towards the pivot pin 212. When tension on the interlock input cable 162 is less than the tension applied by the second tension spring 286, the interlock bracket 110 will slide along the elongated slots 218, 248 until the pivot pin 212 frictionally engages with the proximal end 248B of the pivot slot 248.

The latch pivot link 98, shown in FIGS. 1 and 7, includes a circular portion 98A having a passageway (not shown) through which the pivot pin 212 extends and an actuator arm 98C projecting tangentially away from the circular portion 98A. The circular portion 98A includes an engagement notch 292 in an upper edge 298 configured to matingly engage with the interlock pin 266.

The latch pivot link 98 is positioned between the handle pivot link 90 and the interlock bracket 110 with the pivot pin 212 passing through the interlock bracket 110, the latch pivot link 98, the handle pivot link 90, and the base bracket 84, as illustrated in FIG. 1. The latch pivot link 98 is rotatably coupled to the pivot pin 212 and is selectively coupled to the interlock bracket 110.

The cable pin 104 is fixedly attached to the actuator arm 98C adjacent a distal end 304 of the actuator arm 98C, as illustrated in FIG. 7. A third tension spring 310 has a first end 310A operatively coupled to a notch 316 in the actuator arm 98C and a second end 310B operatively coupled to an aperture 320 in the lower lip 198 of the base bracket 84. The third tension spring 310 rotationally biases the latch pivot link 98 towards the lower lip 198 of the base bracket 84 with respect to the pivot pin 212, as viewed in FIG. 1.

When tension on the easy-entry handle cable 130 and on the interlock input cable 162 are less than the spring bias applied by the first and second tension springs 234, 286, then the first, second, and third tension springs 234, 286, 310 urge the interlock bracket 110, the handle pivot link 90, and the latch pivot link 98 towards a neutral position 324 illustrated in FIG. 7. In the neutral position 324 shown in FIG. 7, the pivot pin 212 is frictionally engaged with the proximal end 248B of the pivot slot 248 in the interlock bracket 110, and the interlock pin 266 is slightly spaced apart from the engagement notch 292 in the latch pivot link 98 such that rotation of the interlock bracket 110 about the pivot pin 212 will result in the interlock pin 266 meshingly engaging with the engagement notch 292 on the latch pivot link 98. The interlock bracket 110, the handle pivot link 90, and the latch pivot link 98 will be in the neutral position 324 when the vehicle seat 14 is in the design position 40 shown in FIG. 2. More specifically, the interlock bracket 110 is shown in an engaged position 110E, the handle pivot link 90 is shown in a neutral rotational position 90N, and the latch pivot link 98 is shown in a latched rotational position 98L when the handle interlock assembly is in the neutral position 324 shown in FIG. 7.

When the easy-entry handle 76 is actuated, tension is applied to the easy-entry handle cable 130, as illustrated by arrow A shown in FIG. 8. When the applied tension is greater than the bias force applied by the first tension spring 234, the easy-entry handle cable 130 will pull the cable pin 94 of the handle pivot link 90 upwardly causing the handle pivot link 90 to rotate in a clockwise direction with respect to the pivot pin 212, as illustrated in FIG. 8. The interlock bracket 110 rotates with the handle pivot link 90 since the shaft 254 extending from the interlock bracket 110 passes through the elongated slot 218 in the handle pivot link 90 and the pivot pin 212 passes through the handle pivot link 90 and through the pivot slot 248 in the interlock bracket 110. Further, as shown in FIG. 8, if the pivot pin 212 is frictionally engaged with the proximal end 248B of the pivot slot 248 in the interlock bracket 110, rotation of the interlock bracket 110 in the clockwise direction results in the interlock pin 266 frictionally engaging and abutting with the engagement notch 292 in the latch pivot link 98. In FIG. 8, the interlock bracket 110 is shown in an engaged position 110E, the handle pivot link 90 is shown in a release rotational position 90R, and the latch pivot link 98 is shown in an unlatched rotational position 98U.

As the handle pivot link 90 and the interlock bracket 110 continue to rotate in the clockwise direction with the interlock pin 266 frictionally engaged with and abutting the engagement notch 292 in the latch pivot link 98, the latch pivot link 98 will also rotate in the clockwise direction, as illustrated by arrow B shown in FIG. 8. Rotation of the latch pivot link 98 in the clockwise direction applies tension to the interlock output cable 144 coupled to the cable pin 104 on the latch pivot link 98. The tension applied to the interlock output cable 144 applies tension to the cushion latch cables 154, 158 (via the first cable splitter 150) and causes the cushion latches 32 to decouple from the seat base frame 28. After the cushion latches 32 are decoupled from the seat base frame 28, the vehicle seat 14 can be pitched forward to the easy-entry position 52 shown in FIG. 4. When the vehicle seat 14 is returned to the design position 40 shown in FIG. 2, the cushion latches 32 engage with the seat base frame 28, and the easy-entry handle 76 returns to an unactuated position 76A (shown in FIG. 6) reducing the tension on the easy-entry handle cable 130. The first, second, and third tension springs 234, 286, 310 urge the handle pivot link 90, the latch pivot link 98, and the interlock bracket 110 towards the neutral position 324 shown in FIG. 9.

Figure 11:
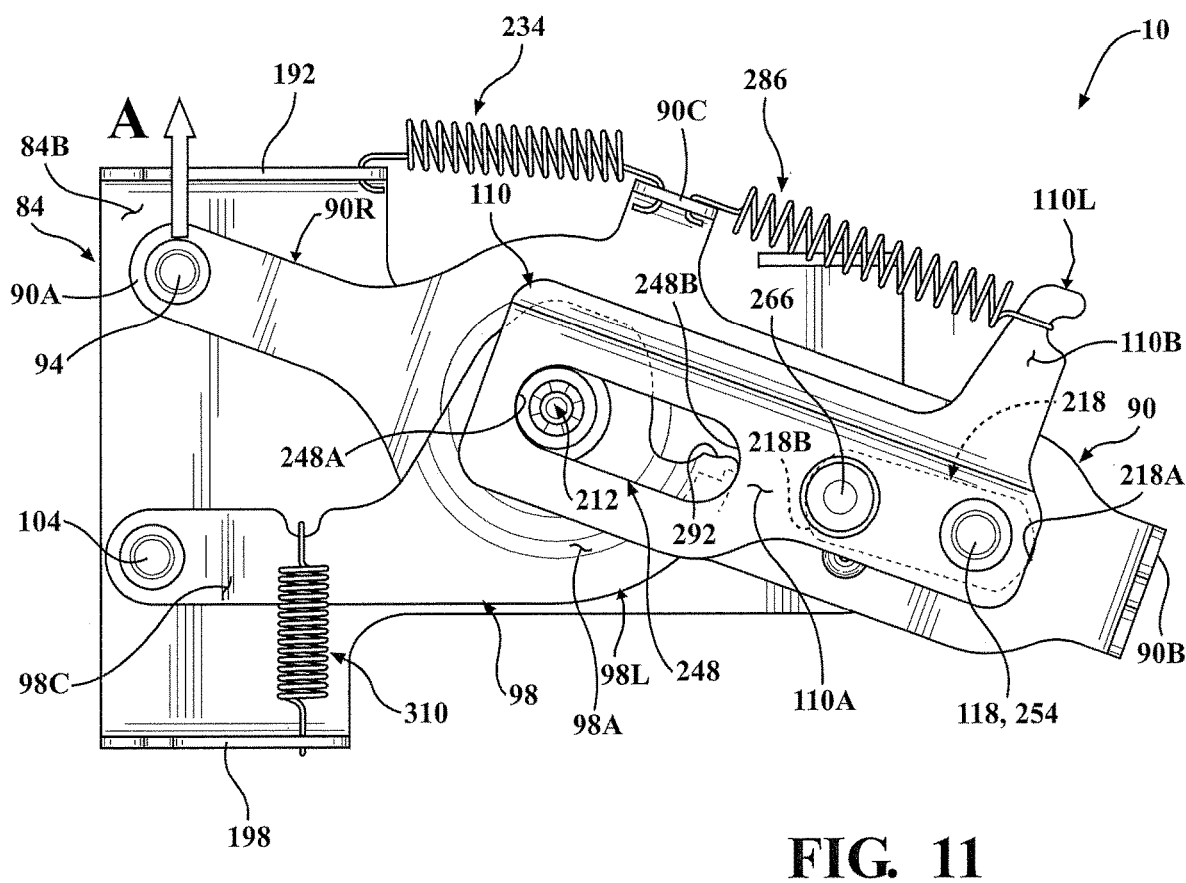
FIG. 11 is a front view of the handle interlock assembly of FIG. 10 showing the rotation of the handle pivot link with the interlock bracket in the interlock position.

When the vehicle seat 14 is in the design position 40 (FIG. 2) and the handle interlock assembly 10 is in the neutral position 324, rotating the seat back 18 towards the seat cushion 22 repositions the vehicle seat 14 into the cargo position 48 shown in FIG. 3. Moving the seat back 18 towards the seat cushion 22 applies tension to the seat back interlock cable 186 and pulls on the interlock input cable 162 to apply tension to the cable pin 118 connected to the interlock bracket 110, as illustrated arrow C shown in FIG. 9. The interlock bracket 110 will slide along the elongated slot 218 in the handle pivot link 90 when the tension applied to the interlock bracket 110 cable pin 118 is greater than the bias force applied by the second tension spring 286. The handle interlock assembly 10 is in an interlock position 330 when the pivot pin 212 frictionally engages with the distal end 248A of the pivot slot 248 in the interlock bracket 110 and the interlock pin 266 is sufficiently spaced apart from the engagement notch 292 such that the interlock pin 266 will not frictionally engage with or abut the engagement notch 292 on the latch pivot link 98 when rotating the interlock bracket 110 about the pivot pin 212 in the clockwise direction, as illustrated in FIGS. 10 and 11. In FIG. 10, the interlock bracket 110 is shown in an interlock position 110L, the handle pivot link 90 is shown in the neutral rotational position 90N, and the latch pivot link 98 is shown in the latched rotational position 98L.

If the easy-entry handle 76 is actuated when the vehicle seat 14 is in the cargo position 48 (FIG. 3), the tension in the easy-entry handle cable 130 rotates the handle pivot link 90 about the pivot pin 212 in the clockwise direction as illustrated by arrow A shown in FIG. 11. However, in contrast to the motion of the handle interlock assembly 10 shown in FIG. 8, when the handle pivot link 90 and the interlock bracket 110 rotate in the clockwise direction with respect to the pivot pin 212, the interlock bracket 110 bypasses the engagement notch 292 in the latch pivot link 98. In this circumstance, the latch pivot link 98 is decoupled from the interlock bracket 110, and the latch pivot link 98 does not rotate in response to the motion of the interlock bracket 110 and the handle pivot link 90. Therefore, even though the easy-entry handle 76 has been actuated, the cushion latches 32 are not decoupled from the seat base frame 28 and movement of the vehicle seat 14 into the misuse position 60 shown in FIG. 5 is effectively prevented. In FIG. 11, the interlock bracket 110 is shown in an interlock position 110L, the handle pivot link 90 is shown in the release rotational position 90R, and the latch pivot link 98 is shown in the latched rotational position 98L.

The tension on the interlock input cable 162 is reduced when the seat back 18 is repositioned to the upright position 44 shown in FIG. 2. Once the bias force provided by the second tension spring 286 is greater than the tension applied by the interlock input cable 162, the second tension spring 286 will urge the interlock bracket 110 towards the neutral position 324 shown in FIG. 7. Releasing the easy-entry handle 76 will result in the handle pivot link 90 rotating to the neutral position 324 in response to the bias force applied by the first tension spring 234.

One benefit of the disclosed handle interlock assembly 10 is the handle interlock assembly 10 integrated within a vehicle rear seat 14 prevents the release of cushion latches 32 when the seat back 18 is rotated towards the seat cushion 22. Another benefit is the handle interlock assembly 10 prevents the vehicle rear seat 14 from being placed into the easy-entry position 52 when the seat back 18 is folded towards the seat cushion 22 or into the cargo position. A third benefit is the tension is automatically removed from the cushion latch cables 154, 158 returning the seat cushion 22 latches to the coupled position with the seat base frame 28 when the easy-entry handle 76 is returned to the disengaged position 76A. A fourth benefit is the handle interlock assembly 10 is automatically repositioned into the neutral position 324 when the seat back 18 is returned to the upright position 44 and the easy-entry handle 76 is returned to a deactivated condition 76A.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A handle interlock assembly for a vehicle seat, said handle interlock assembly comprising:
a base bracket;
a pivot pin rotatably coupling a handle pivot link, an interlock bracket, and a latch pivot link to said base bracket;
said handle pivot link operatively coupled to a handle, said handle being repositionable between a first handle position and a second handle position, wherein repositioning said handle from said first handle position to said second handle position automatically rotates said handle pivot link about said pivot pin in a first rotational direction from a neutral rotational position to a release rotational position;
said latch pivot link being operatively coupled to a vehicle seat latch such that rotating said latch pivot link about said pivot pin in said first rotational direction from a latched rotational position to an unlatched rotational position automatically disengages said vehicle seat latch; and
said interlock bracket being slidably coupled to said handle pivot link and repositionable between an engaged position and an interlock position;
wherein:
when said interlock bracket is in said engaged position, repositioning said handle from said first handle position to said second handle position rotates said handle pivot link in said first rotational direction causing said interlock bracket to frictionally engage with said latch pivot link such that said latch pivot link rotates in said first rotational direction; and
when said interlock bracket is in said interlock position, repositioning said handle from said first handle position to said second handle position rotates said handle pivot link in said first rotational direction causing said interlock bracket to bypass said latch pivot link such that said latch pivot link is disengaged from said interlock bracket.

2. The handle interlock assembly as set forth in claim 1, said interlock bracket including an interlock pin; and
said latch pivot link including an engagement notch;
wherein said interlock pin and said engagement notch are configured to frictionally engage when said interlock bracket is in said engaged position and said handle pivot link is rotated in said first rotational direction about said pivot pin towards said release rotational position; and
wherein said interlock pin and said engagement notch are configured to be spaced apart when said interlock bracket is in said interlock position and said handle pivot link is rotated in said first rotational direction about said pivot pin towards said release rotational position.

3. The handle interlock assembly as set forth in claim 2, wherein:
said base bracket includes a stop feature; and
said handle pivot link is rotatable about said pivot pin in a second rotational direction different than said first rotational direction to said neutral rotational position defined by said handle pivot link frictionally engaging said stop feature.

4. The handle interlock assembly as set forth in claim 3, said handle interlock assembly including a first tension spring;
said first tension spring having a first end coupled with said base bracket and a second end coupled with said handle pivot link; and
said first tension spring biasing said handle pivot link in said second rotational direction about said pivot pin towards said neutral rotational position.

5. The handle interlock assembly as set forth in claim 4, wherein when said handle is in said first handle position, bias force applied by said first tension spring automatically rotates said handle pivot link in said second rotational direction towards said stop feature of said base bracket.

6. The handle interlock assembly as set forth in claim 5, wherein:
said handle pivot link has an elongated interlock slot extending in a longitudinal direction of said handle pivot link, said interlock slot having proximal and distal interlock slot ends and opposing interlock slot sides;
said interlock bracket having an elongated pivot slot extending in a longitudinal direction of said interlock bracket, said pivot slot having proximal and distal pivot slot ends and opposing pivot slot sides, said interlock bracket having a locator shaft projecting at an angle from said interlock bracket and passing through said interlock slot in said handle pivot link;
said pivot pin passing through said pivot slot in said interlock bracket; and
said interlock bracket being repositionable in said longitudinal direction of said handle pivot link between said engaged position with said pivot pin frictionally engaging said proximal end of said pivot slot and said interlock position with said pivot pin frictionally engaging said distal pivot slot end.

7. The handle interlock assembly as set forth in claim 6, said handle interlock assembly including a second tension spring;
said second tension spring having a first end coupled with said interlock bracket and a second end coupled with said handle pivot link; and said second tension spring biasing said proximal end of said pivot slot towards said pivot pin.

8. The handle interlock assembly as set forth in claim 7, said handle interlock assembly including a third tension spring;
   said third tension spring having a first end coupled with said base bracket and a second end coupled with said latch pivot link; and
   said third tension spring biasing said latch pivot link in said second rotational direction about said pivot pin towards said latched rotational position.

9. The handle interlock assembly as set forth in claim 8, wherein:
   said handle operatively coupled to a vehicle seat;
   said vehicle seat comprising a seat back rotatably coupled to a seat cushion;
   said seat back having an upright use position and having a folded position with said seat back rotated towards said seat cushion; and
   said seat cushion rotatably coupled to a seat base frame, said seat cushion having a seat latch configured to releasably couple said seat cushion to said seat base frame preventing rotation of said seat cushion with respect to said seat base frame when said seat latch is coupled to said seat base frame, said seat cushion having a use position and a second position, in said use position said seat latch is coupled to said seat base frame, and in said second position said seat latch is decoupled from said seat base frame.

10. The handle interlock assembly as set forth in claim 9, wherein rotating said seat back between said upright use position and said folded position automatically repositions said interlock bracket between said engaged position and said interlock position.

11. The handle interlock assembly as set forth in claim 10, said vehicle seat including a first cable operatively coupled at a first end to said handle and operatively coupled at a second end to said handle pivot link;
   wherein repositioning said handle from said first handle position to said second handle position repositions said first cable such that said second end of said first cable rotates said handle pivot link away from said neutral rotational position.

12. The handle interlock assembly as set forth in claim 11, said vehicle seat including a second cable operatively coupled at a first end to said interlock bracket and operatively coupled at a second end to said vehicle seat; and
   wherein rotating said seat back towards said seat cushion repositions said second cable such that said second cable repositions said interlock bracket towards said interlock position.

13. The handle interlock assembly as set forth in claim 12, wherein when said seat back is in said upright use position, tension applied by said second cable to said interlock bracket is less than tension applied by said second tension spring to said interlock bracket such that said second tension spring repositions said interlock bracket towards said engaged position.

14. The handle interlock assembly as set forth in claim 13, wherein:
   said vehicle seat being repositionable between a design position, a cargo position, and an easy-entry position;
   said vehicle seat being in said design position when said seat cushion is in said use position with said seat latch releasably coupled to said seat base frame and said seat back in said upright use position;
   said vehicle seat being in said cargo position when said seat back is rotated towards said seat cushion to said folded position and said seat cushion in said use position with said seat latch releasably coupled to said seat base frame; and
   said vehicle seat in said easy-entry position when said seat back is in said upright use position, said seat latch is decoupled from said seat base frame, and said seat cushion is rotated away from said use position.

15. The handle interlock assembly as set forth in claim 14, wherein:
   said handle pivot link, said latch pivot link, and said interlock bracket are rotatable about a common axis of rotation.

16. The handle interlock assembly as set forth in claim 15, wherein:
   said handle pivot link and said latch pivot link are selectively rotatably coupled.

* * * * *